(12) United States Patent  (10) Patent No.: US 7,593,169 B2
Ouchi  (45) Date of Patent: Sep. 22, 2009

(54) OPTICAL OPTION ATTACHMENT RING

(75) Inventor: Syunichiro Ouchi, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 188 days.

(21) Appl. No.: 11/790,632

(22) Filed: Apr. 26, 2007

(65) Prior Publication Data

US 2007/0253079 A1  Nov. 1, 2007

(30) Foreign Application Priority Data

Apr. 28, 2006 (JP) ............................. 2006-125681

(51) Int. Cl.
*G02B 15/14* (2006.01)
(52) U.S. Cl. ................. 359/702; 359/703; 359/704; 359/827; 359/828; 359/830
(58) Field of Classification Search ......... 359/702–704, 359/811, 819, 827, 828, 830; 396/529, 530, 396/535
See application file for complete search history.

(56) References Cited

U.S. PATENT DOCUMENTS 5,327,188 A    7/1994  Kohmoto 5,946,516 A *  8/1999  Yoshida et al. ............. 396/529

FOREIGN PATENT DOCUMENTS

| JP | 2-63037 A | 3/1990 |
|---|---|---|
| JP | 2004 109717 A | 4/2004 |
| JP | 2004-271892 A | 9/2004 |

* cited by examiner

*Primary Examiner*—Joseph Martinez
(74) *Attorney, Agent, or Firm*—Birch, Stewart, Kolasch & Birch, LLP (57) ABSTRACT

The present invention provides an optical option attachment ring comprising: a ring body into which a lens barrel is inserted; a clamping ring rotatably fastened on the periphery of the ring body; an elastic member arranged between the ring body and the clamping ring; and an abutting portion which is provided on the clamping ring and abuts on the elastic member according to the rotational position of the clamping ring to elastically deform the elastic member to cause at least a part of the elastic member to project further inwards than the inner peripheral surface of the ring body and to be positioned in a groove formed in the lens barrel.

5 Claims, 9 Drawing Sheets

OPTICAL OPTION ATTACHMENT RING

BACKGROUND OF THE INVENTION

1. Field of the Invention

The present invention relates to an optical option attachment ring, and in particular, to an optical option attachment ring which has the same substantially cylindrical contour as a lens barrel and no projection.

2. Description of the Related Art

An optical option attachment ring for mounting a wide-angle converter and teleconverter on a lens barrel has been known hitherto (refer to, for example, Japanese Patent Application Laid-Open No. 2004-271892).

Figure 7:
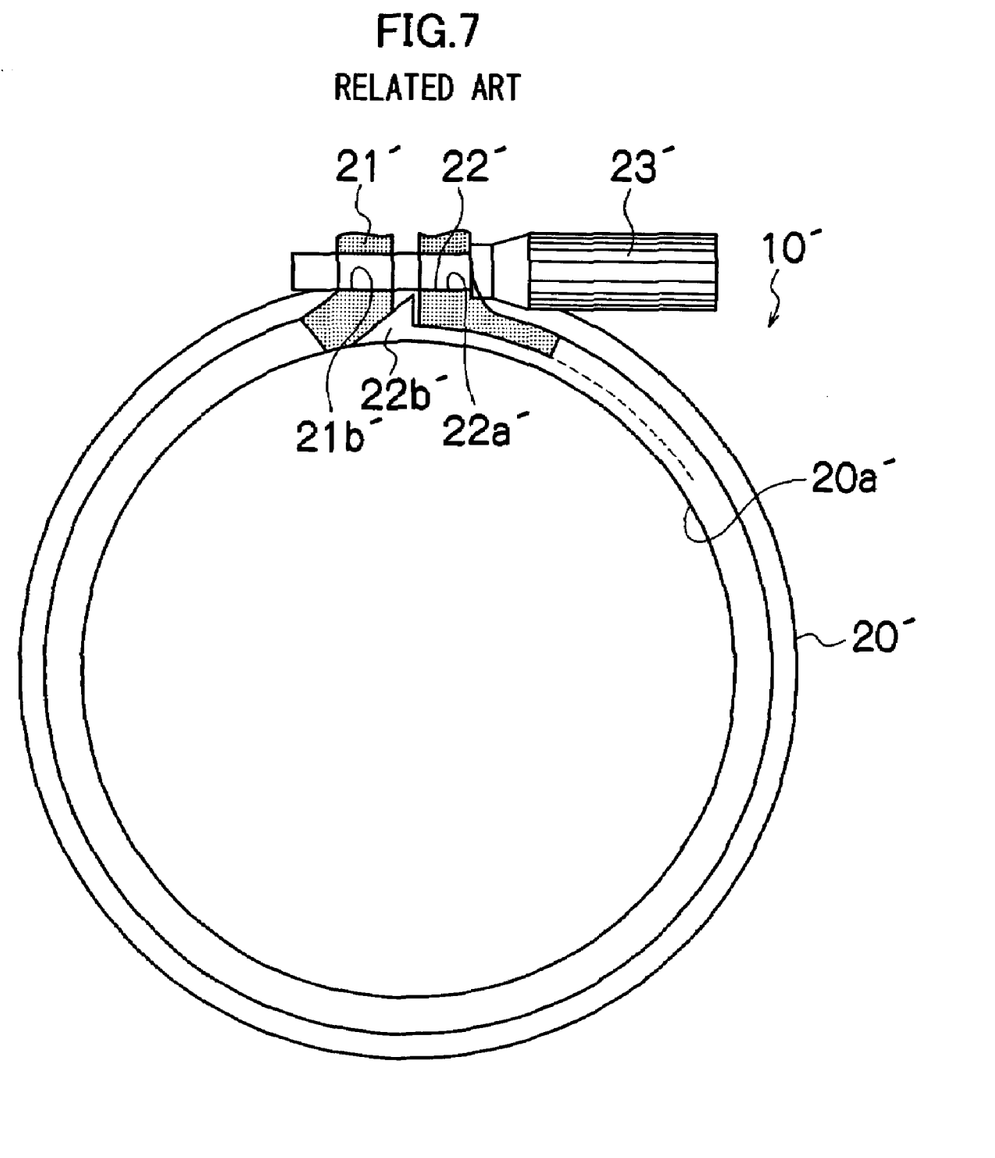
FIG. 7 describes the configuration of a conventional optical option attachment ring.

An optical option attachment ring according to Japanese Patent Application Laid-Open No. 2004-271892 is described below with reference to a drawing. As illustrated in FIG. 7, the optical option attachment ring 10' includes one end 21' and the other end 22' arranged at predetermined spaced intervals, a ring body 20' which couples the one end 21' to the other end 22' and into which a lens barrel (not shown) is inserted, and a fixing screw 23' which is inserted into screw holes 21a' and 22a' causing the one end 21' to communicate with the other end 22'. In the optical option attachment ring 10', the fixing screw 23' is fastened to cause the one end 21' to be close to the other end 22' to decrease the ring body 20' in diameter, fixing the ring body 20' to the lens barrel and the fixing screw 23' is loosened to cause the one end 21' to be apart from the other end 22' to increase the ring body 20' in diameter, releasing the fixing.

As illustrated in FIG. 7, the one end 21' and the other end 22' of the optical option attachment ring 10' are slanted. Fastening the fixing screw 23' causes a portion 22b' of the other end 22' to move along the slant face of the one end 21' and project inside the inner surface 20a' of the ring body 20' and be positioned in (be engaged with) a groove (not shown) formed in the lens barrel. This prevents the optical option attachment ring 10' from falling off the lens barrel even if the fixing screw 23' loosens.

SUMMARY OF THE INVENTION

However, in the optical option attachment ring 10' according to Japanese Patent Application Laid-Open No. 2004-271892, the one end 21' and the other end 22' protrude from the cylindrical contour, which causes a problem in that the protruding one end 21' and the other end 22' may be caught on or hit something around the periphery.

In view of the above, the present invention has been made and has its purpose to provide an optical option attachment ring which has the same substantially cylindrical contour as a lens barrel and no projection.

The present invention has been made to solve the above problems. An optical option attachment ring according to a first aspect of the present invention comprises a ring body into which a lens barrel is inserted, a clamping ring rotatably fastened on the periphery of the ring body, an elastic member arranged between the ring body and the clamping ring and an abutting portion which is provided on the clamping ring and abuts on the elastic member according to the rotational position of the clamping ring to elastically deform the elastic member to cause at least a part of the elastic member to project further inwards than the inner peripheral surface of the ring body and to be positioned in a groove formed in the lens barrel.

According to the first aspect of the present invention, the rotation of the clamping ring causes at least a part of the elastic member (for instance, the curved portion of the leaf spring) to project further inwards than the inner peripheral surface of the ring body according to the rotational position of the clamping ring and to be positioned in a groove formed in the lens barrel. In other words, at least a part of the elastic member is engaged with the groove. Unlike a conventional mounting ring, there is no need to provide a portion (the one end and the other end) projected from a cylindrical contour because the elastic member is engaged with the groove. Accordingly, it is enabled to provide the optical option attachment ring which has the same substantially cylindrical contour as the lens barrel and no projection.

Furthermore, a conventional fixing screw has been so small in diameter to make it difficult to tighten. According to the first aspect of the present invention, the clamping ring is comparatively larger in diameter, which make it relatively easy to tighten.

According to a second aspect of the present invention, in the first aspect, the ring body includes an opening causing the periphery and the inner peripheral surface of the ring body to communicate with each other, the elastic member is a leaf spring with a fixed end fixed to the ring body, a free end movable between the inner peripheral surface of the clamping ring and the periphery of the ring body in the radial direction and a curved portion formed between the fixed end and the free end and positioned in the opening, and the clamping ring is provided with relatively thin and thick portions on the inner peripheral surface thereof and rotated to cause the thick portion to abut on the free end of the elastic member to elastically deform the elastic member to cause the curved portion to project further inwards than the inner peripheral surface of the ring body from the opening and to be positioned in a groove formed in the lens barrel.

According to the second aspect of the present invention, the rotation of the clamping ring causes the curved portion of the leaf spring to project further inwards than the inner peripheral surface of the ring body from the opening according to the rotational position of the clamping ring and to be positioned in a groove formed in the lens barrel. In other words, the curved portion of the leaf spring is engaged with the groove. Unlike a conventional mounting ring, there is no need to provide a portion (the one end and the other end) projected from a cylindrical contour because the curved portion of the leaf spring is engaged with the groove. Accordingly, it is enabled to provide the optical option attachment ring which has the same substantially cylindrical contour as the lens barrel and no projection.

Furthermore, a conventional fixing screw has been so small in diameter to make it difficult to tighten. According to the second aspect of the present invention, the clamping ring is comparatively larger in diameter, which makes it relatively easy to tighten.

According to a third aspect of the present invention, in the first or the second aspect, the clamping ring is rotated to cause the thick portion to abut on the free end of the elastic member to elastically deform the elastic member to cause the curved portion to project further inwards than the inner peripheral surface of the ring body from the opening and to abut on the bottom of the groove formed in the lens barrel.

According to the third aspect of the present invention, slightly rotating the clamping ring allows the optical option attachment ring to be fixed to the lens barrel (hitherto, a fixing screw needs to be given a few turns to fix a mounting ring to a lens barrel).

According to a fourth aspect of the present invention, in any of the first to the third aspect, the optical option attachment ring further comprises a rotation regulating projection provided on the inner peripheral surface of the clamping ring and projecting into the opening.

According to the fourth aspect of the present invention, the effect of the rotation regulating projection causes the clamping ring not to rotate any more, thereby a user is enabled to be informed that the optical option attachment ring is closely fitted to the lens barrel (or that the optical option attachment ring can be removed from the lens barrel).

According to the present invention, it is enabled to provide an optical option attachment ring which has the same substantially cylindrical contour as a lens barrel and no projection.

DETAILED DESCRIPTION OF THE PREFERRED EMBODIMENTS

Referring to the accompanying drawings, preferred embodiments of the optical option attachment ring according to the present invention are described below.

Figure 1:
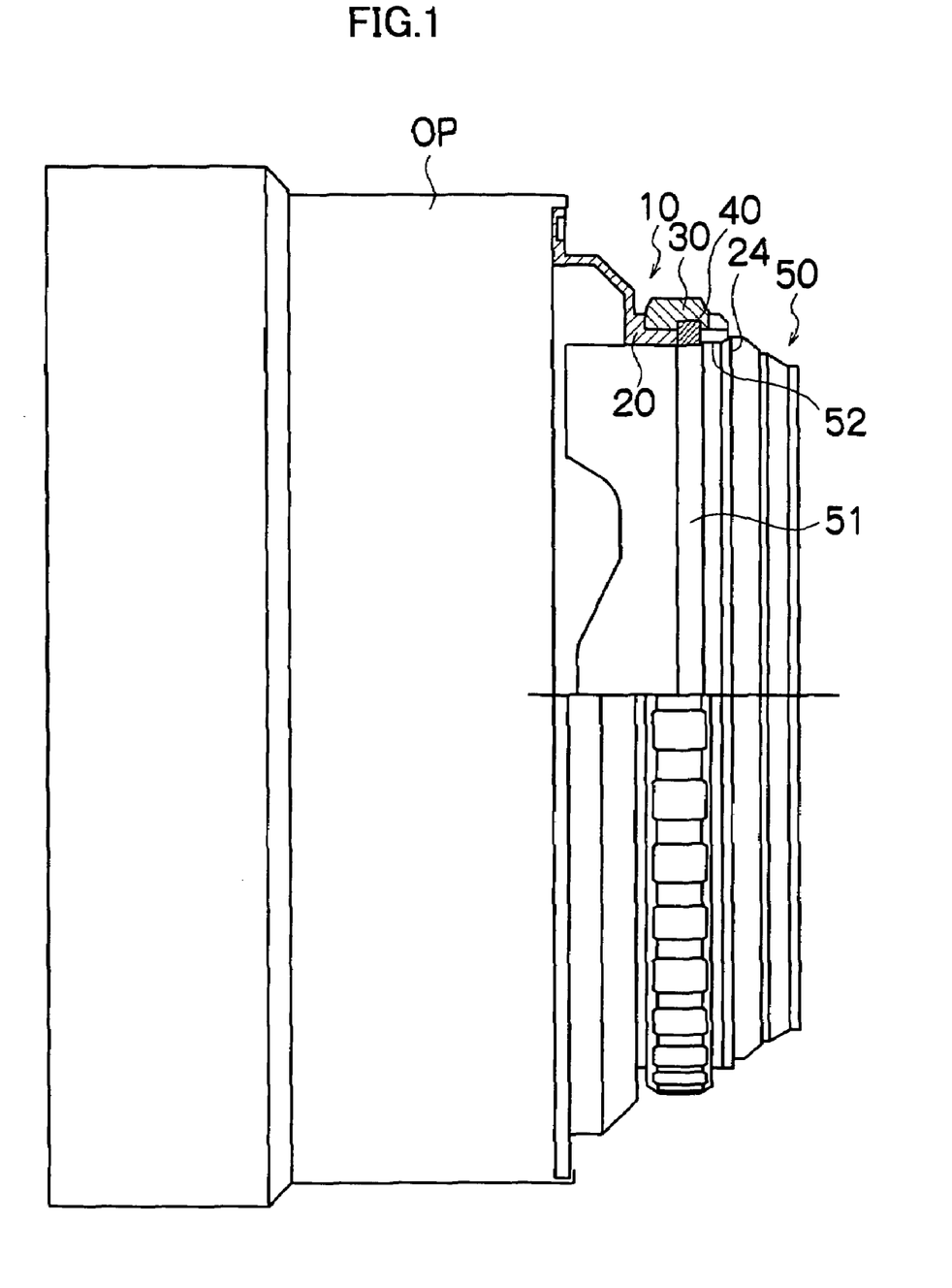
FIG. 1 describes the configuration of an optical option attachment ring according to the present invention.
Figure 2:
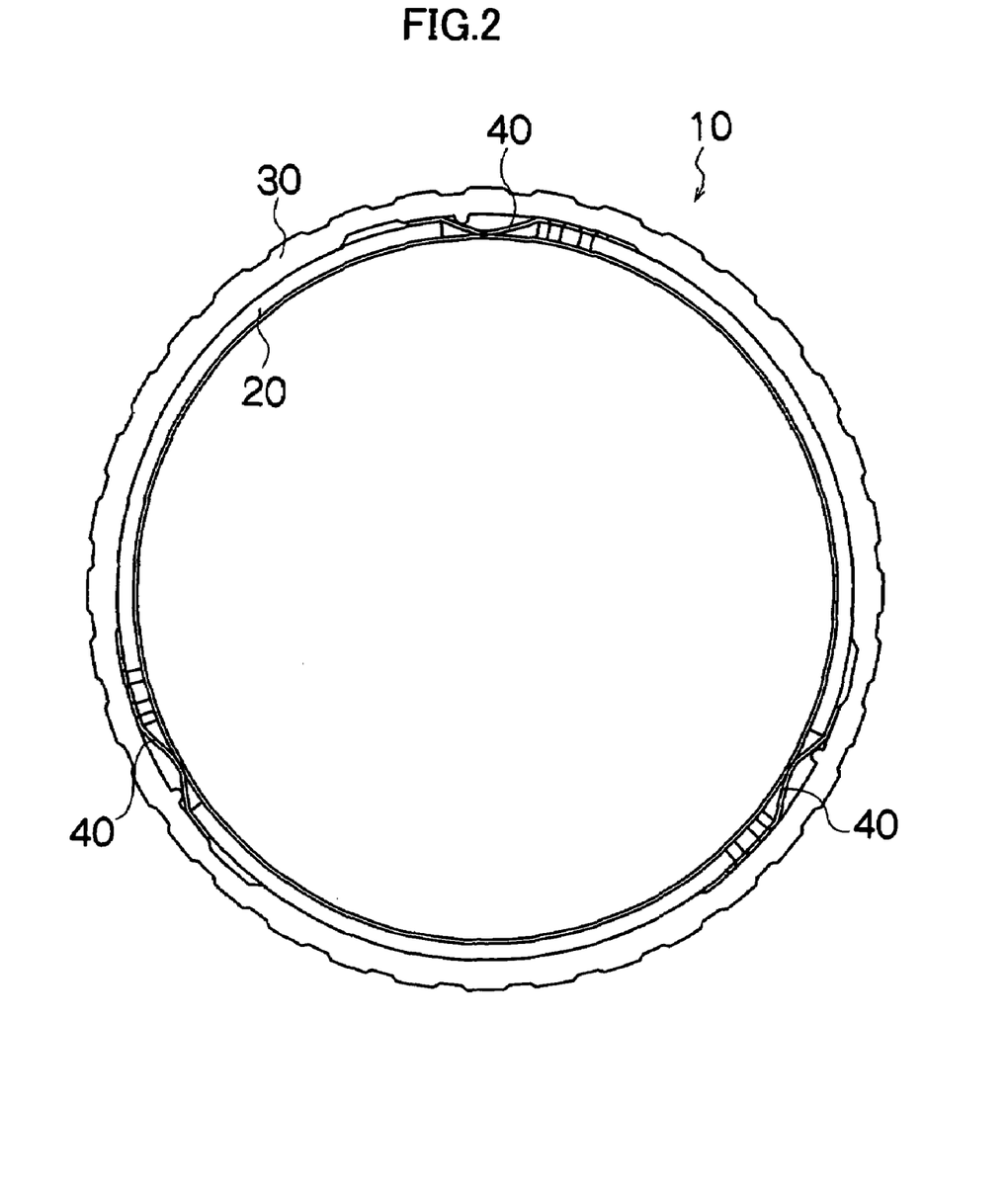
FIG. 2 describes the configuration of an optical option attachment ring according to the present invention.

FIGS. 1 and 2 describe the configuration of an optical option attachment ring according to the present invention.

As illustrated in FIGS. 1 and 2, the optical option attachment ring 10 is used to mount optical accessories OP such as a wide-angle converter and teleconverter on a lens barrel 50. It basically includes a ring body 20 into which the lens barrel 50 is inserted and a clamping ring 30 rotatably mounted on the periphery of the ring body 20.

Figure 3:
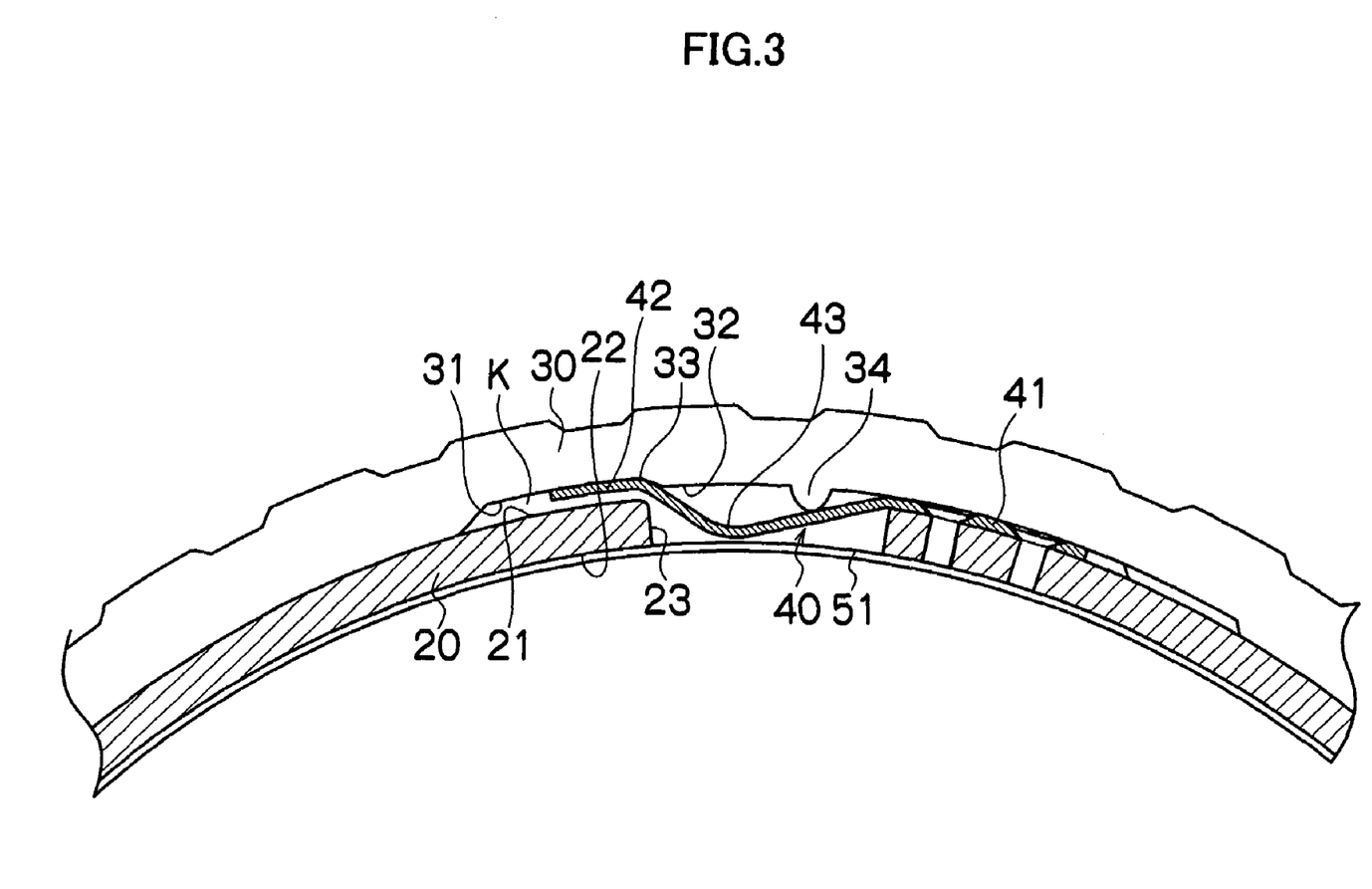
FIG. 3 describes a configuration to elastically deform a leaf spring.

As illustrated in FIG. 3, a leaf spring 40 is arranged between the ring body 20 and the clamping ring 30 (three leaf springs are illustrated as examples in FIG. 2). The one end 41 of the leaf spring 40 is fixed to the ring body 20 using screws and the other end 42 thereof is a free end which is movable in the radial direction. The leaf spring 40 is provided with a curved portion 43 which has a ridge, a groove and a ridge in this order between the one end 41 and the other end 42 thereof. The curved portion 43 is positioned in an opening 23 which causes a periphery 21 of the ring body 20 to communicate with an inner peripheral surface 22 thereof. The leaf spring 40 may be formed of a metallic plate or synthetic resin.

The clamping ring 30 is provided with portions 31 and 32 which are relatively thin and thick in thickness respectively on its inner peripheral surface. The other end 42 of the leaf spring 40 is positioned in a space K defined by the thin portion 31 and the periphery 21 of the ring body 20. The thin and the thick portion 31 and 32 continue through a slope 33.

Figure 4:
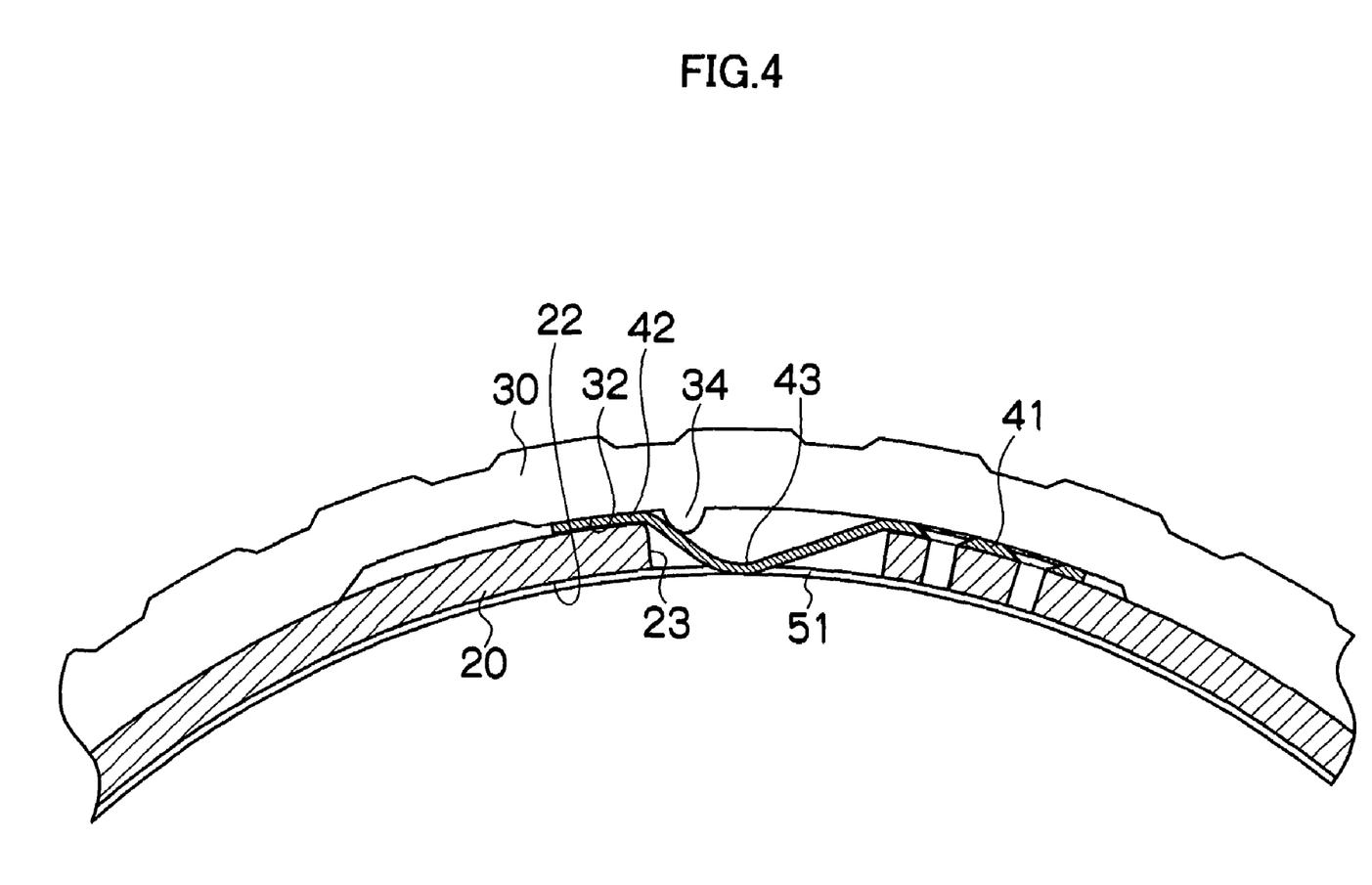
FIG. 4 describes a configuration to elastically deform a leaf spring.

In FIG. 3, the counterclockwise rotation of the clamping ring 30 causes the other end 42 of the leaf spring 40 to relatively move along the thin portion 31 and the slope 33 and soon reach the thick portion 32 as illustrated in FIG. 4. At this point, a rotation regulating projection 34 which is provided on the inner peripheral surface (on the thick portion 32) of the clamping ring 30 and projects into the opening 23 abuts on the other end 42 of the leaf spring 40, causing the clamping ring 30 not to rotate any more.

As illustrated in FIG. 4, when the thick portion 32 is reached by the other end 42 of the leaf spring 40 (in other words, when the clamping ring 30 does not rotate any more), the thick portion 32 abuts on the other end 42 of the leaf spring 40 to elastically deform the leaf spring 40 (in other words, to displace the other end 42 of the leaf spring 40 downward). For this reason, the curved portion 43 projects further inwards than the inner peripheral surface 22 of the ring body 20. That is to say, the curved portion 43 is positioned a groove 51 formed in the lens barrel 50 (or, the curved portion 43 abuts on the bottom of the groove 51 formed in the lens barrel 50 depending on projections) and engaged with the groove 51. This closely fits the optical option attachment ring 10 to the lens barrel 50.

Figure 5:
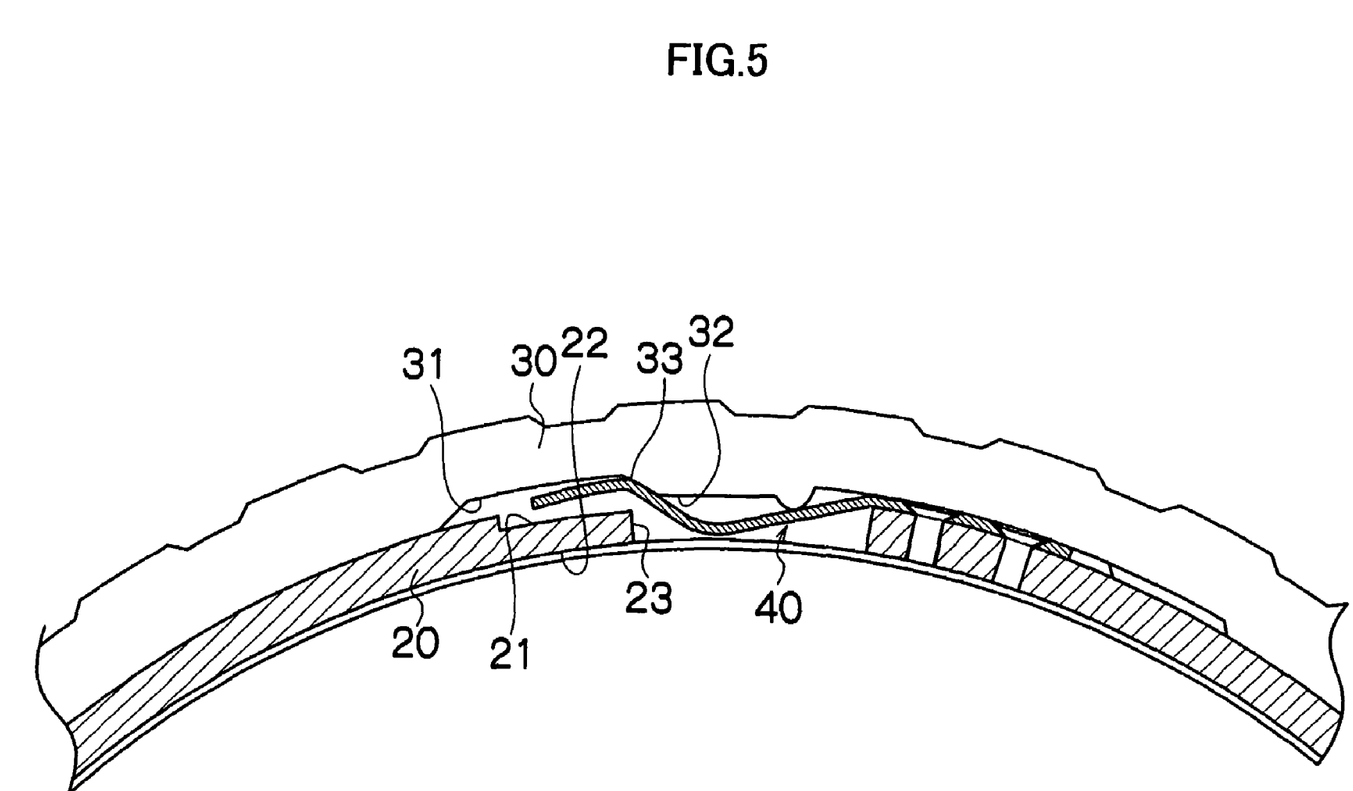
FIG. 5 describes the modification example of a configuration to elastically deform a leaf spring.

As illustrated in FIG. 5, a thin portion is provided on the ring body 20 and the thick portion 32 of the clamping ring 30 is further increased in thickness, whereby the curved portion 43 may be projected further inwards than the inner peripheral surface 22 of the ring body 20. This enables the optical option attachment ring 10 to be more closely fitted to the lens barrel 50.

On the other hand, in FIG. 4, the clockwise rotation of the clamping ring 30 causes the other end 42 of the leaf spring 40 to relatively move along the thick portion 32 and the slope 33 and soon reach the thin portion 31 as illustrated in FIG. 3. At this point, the rotation regulating projection 34 which is provided on the inner peripheral surface (on the thick portion 32) of the clamping ring 30 and projects into the opening 23 abuts on the one end 41 of the leaf spring 40, causing the clamping ring 30 not to rotate any more.

As illustrated in FIG. 3, when the thin portion 31 is reached by the other end 42 of the leaf spring 40 (in other words, when the clamping ring 30 does not rotate any more), the other end 42 of the leaf spring 40 is displaced upward by a force recovering to its original shape before the elastic deformation of the leaf spring 40. For this reason, the curved portion 43 is positioned further outwards than the inner peripheral surface 22 of the ring body 20. That is to say, the curved portion 43 is positioned again in the opening 23.

An example of application of the optical option attachment ring 10 thus configured is briefly described below.

First, it is described how the optical option attachment ring 10 works when mounted.

As illustrated in FIG. 3, the curved portion 43 is positioned further outwards than the inner peripheral surface 22 of the ring body 20 (in other words, the curved portion 43 is positioned in the opening 23). For this purpose, the clamping ring 30 is rotated clockwise in FIG. 4 to such an extent that the rotation regulating projection 34 abuts on the one end 41 of the leaf spring 40 not to rotate the clamping ring 30 any more.

Second, as illustrated in FIG. 1, the lens barrel 50 (end portion thereof) is inserted into the ring body 20. An end face 24 of the ring body 20 abuts on a projecting portion 52 (extending in the circumferential direction) of the lens barrel 50, enabling the ring body to be easily located when the lens barrel is inserted.

In the next place, as illustrated in FIG. 4, the curved portion 43 is caused to project further inwards than the inner peripheral surface 22 of the ring body 20. For this purpose, the clamping ring 30 is rotated counterclockwise in FIG. 3 to such an extent that the rotation regulating projection 34 abuts on the other end 42 of the leaf spring 40 not to rotate the clamping ring 30 any more. This rotation causes the other end 42 of the leaf spring 40 to relatively move along the thin portion 31 and the slope 33 and soon reach the thick portion 32 as illustrated in FIG. 4. The thick portion 32 abuts on the other end 42 of the leaf spring 40 to elastically deform the leaf spring 40 (in other words, to displace the other end 42 of the leaf spring 40 downward). For this reason, the curved portion 43 projects further inwards than the inner peripheral surface 22 of the ring body 20. That is to say, as illustrated in FIG. 4, the curved portion 43 is positioned in a groove 51 formed in the lens barrel 50 (or, the curved portion 43 abuts on the bottom of the groove 51 formed in the lens barrel 50 depending on projections) and engaged with the groove 51. This enables the optical option attachment ring 10 to be closely fitted to the lens barrel 50. That is to say, slightly rotating the clamping ring 30 allows the optical option attachment ring 10 to be fixed to the lens barrel 50 (hitherto, a fixing screw needs to be given a few turns to fix a mounting ring to a lens barrel).

The positional relationship illustrated in FIG. 3 is kept by a frictional force caused between the inner peripheral surface of the clamping ring 30 and the periphery of the ring body 20.

The rotation regulating projection 34 abuts on the other end 42 of the leaf spring 40 not to rotate the clamping ring 30 any more, thereby a user is enabled to be informed that the optical option attachment ring 10 is closely fitted to the lens barrel 50.

In the following, it is described how the optical option attachment ring 10 works when demounted.

As illustrated in FIG. 3, the curved portion 43 is positioned further outwards than the inner peripheral surface 22 of the ring body 20 (in other words, the curved portion 43 is positioned in the opening 23). For this purpose, the clamping ring 30 is rotated clockwise in FIG. 4 to such an extent that the rotation regulating projection 34 abuts on the one end 41 of the leaf spring 40 not to rotate the clamping ring 30 any more. This rotation causes the other end 42 of the leaf spring 40 to relatively move along the thick portion 32 and the slope 33 and soon reach the thin portion 31 as illustrated in FIG. 3. The other end 42 of the leaf spring 40 is displaced upward at the thin portion 31 by a force recovering to its original shape before the elastic deformation of the leaf spring 40. For this reason, the curved portion 43 is positioned further outwards than the inner peripheral surface 22 of the ring body 20. That is to say, the curved portion 43 is positioned again in the opening 23. This allows the optical option attachment ring 10 to be demounted from the lens barrel 50.

The positional relationship illustrated in FIG. 4 is kept by a frictional force caused between the inner peripheral surface of the clamping ring 30 and the periphery of the ring body 20.

The rotation regulating projection 34 abuts on the one end 41 of the leaf spring 40 not to rotate the clamping ring 30 any more, thereby a user is enabled to be informed that the optical option attachment ring 10 can be demounted from the lens barrel 50.

As described above, according to the optical option attachment ring 10 of the present embodiment, the rotation of the clamping ring 30 causes the curved portion 43 of the leaf spring 40 to project further inwards than the inner peripheral surface 22 of the ring body 20 according to the rotational position of the clamping ring 30 and to be positioned in the groove 51 formed in the lens barrel 50 (or, the curved portion 43 abuts on the bottom of the groove 51 formed in the lens barrel 50 depending on projections). That is, the curved portion 43 of the leaf spring 40 is engaged with the groove 51.

Unlike a conventional mounting ring, there is no need to provide a portion (one end and the other end) protruded from a cylindrical contour because the curved portion of the leaf spring is engaged with the groove formed in the lens barrel. As a result, it is enabled to provide the optical option attachment ring 10 which has the same substantially cylindrical contour as the lens barrel 50 and no projection.

Furthermore, a conventional fixing screw has been so small in diameter to make it difficult to tighten. According to the optical option attachment ring 10 of the present embodiment, the clamping ring 30 is comparatively larger in diameter, which make it relatively easy to tighten.

An example of a modification is described in the following.

In the embodiment described above, although the positional relationship illustrated in FIG. 3 (or in FIG. 4) is kept by a frictional force caused between the inner peripheral surface of the clamping ring 30 and the periphery of the ring body 20, the present invention is not limited to the above.

Figure 6A:
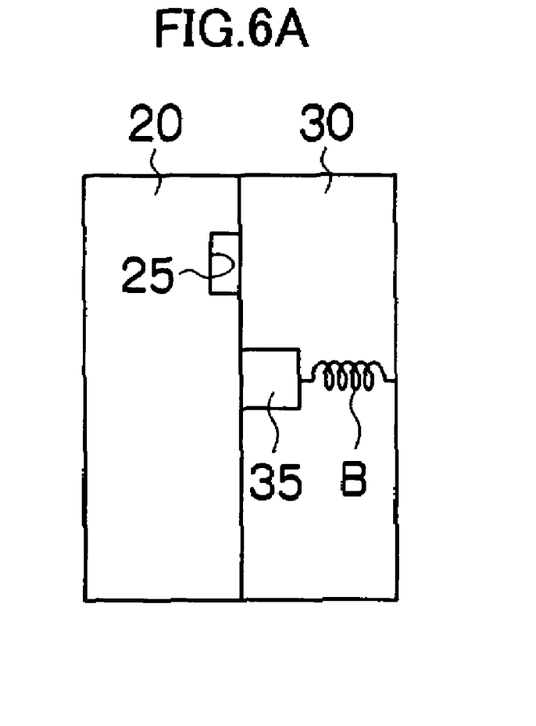
FIGS. 6A and 6B are examples of configuration to keep the relationship between a ring body 20 and a clamping ring 30.
Figure 6B:
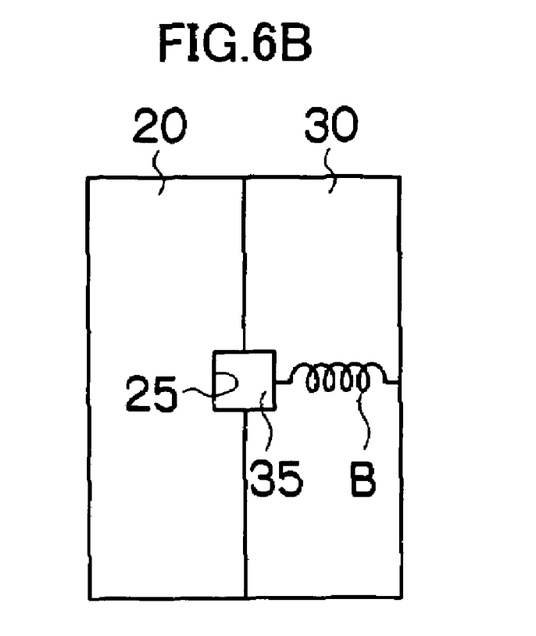

For instance, as illustrated in FIG. 6A, the ring body 20 is provided with a depression 25 and the clamping ring 30 is provided with an engaging portion 35 capable of entering the depression 25 and a spring B urging the engaging portion 35. When the clamping ring 30 is rotated counterclockwise in FIG. 3 (or counterclockwise in FIG. 4) to such an extent that the rotation regulating projection 34 abuts on the other end 42 (or the one end 41) of the leaf spring 40 not to rotate the clamping ring 30 any more, the engaging portion 35 is caused to enter the depression 25 by the urging force of the spring B as illustrated in FIG. 6B. This may be used to keep the positional relationship illustrated in FIG. 3 (or in FIG. 4).

Incidentally, the clamping ring 30 may be provided with the depression 25 and the ring body 20 may be provided with the engaging portion 35 capable of entering the depression 25 and the spring B urging the engaging portion 35.

Although three leaf springs 40 are exemplified in the above embodiments, the present invention is not limited to this. For example, one, two, or four leaf springs 40 may be provided.

Figure 8:
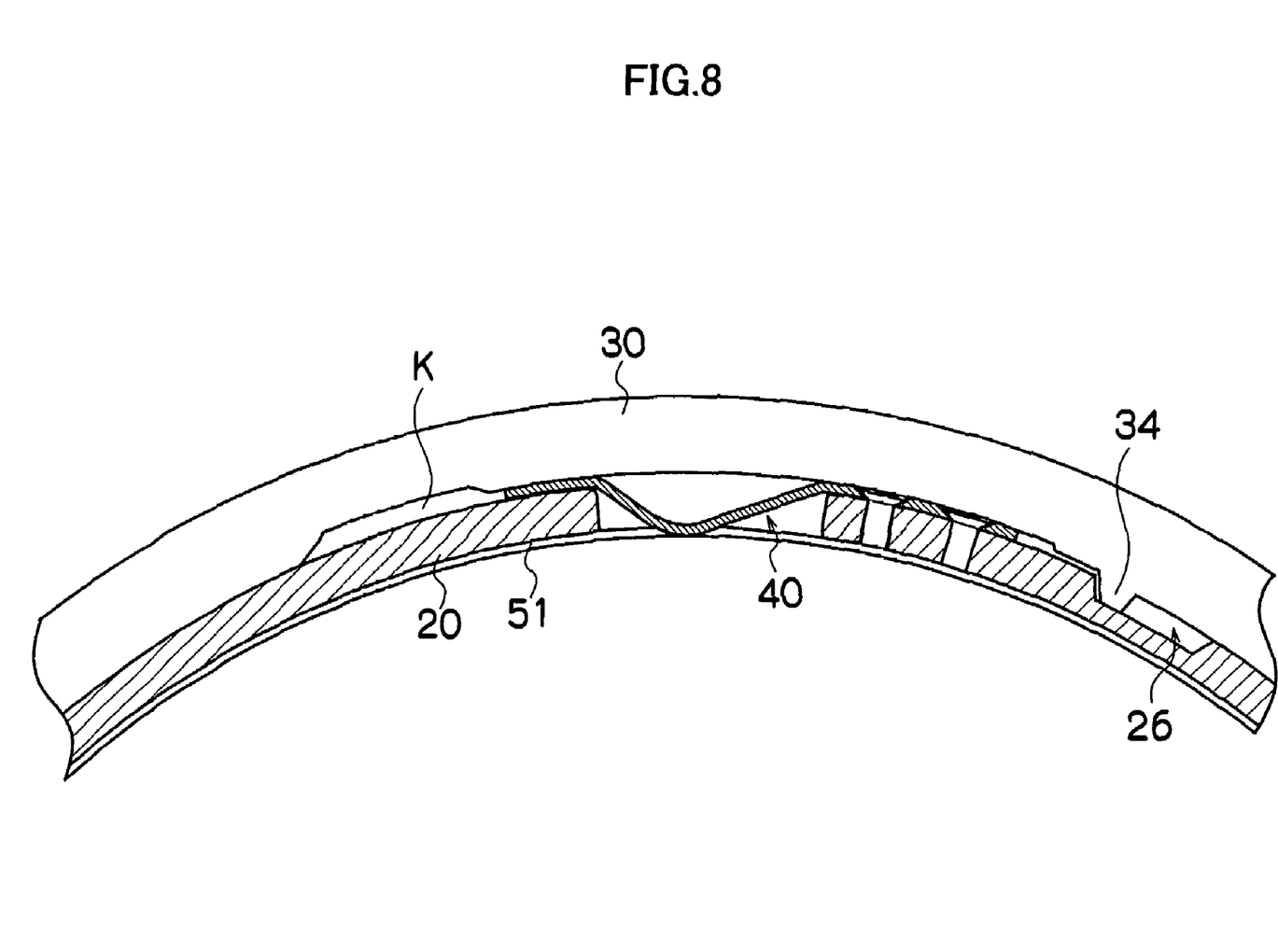
FIG. 8 describes an example of modification of a rotation regulating projection 34.

Although the rotation regulating projection 34 provided on the inner peripheral surface of the clamping ring 30 and projecting into the opening 23 abuts on the other end 42 (or on the one end 41) of the leaf spring 40 to cause the clamping ring 30 not to rotate any more in the embodiment described above, the present invention is not limited to this. For example, as illustrated in FIG. 8, the rotation regulating projection 34 may be provided on the inner peripheral surface of the clamping ring 30 and a depression 26 (for example, a groove) in which the projection 34 is positioned is provided in the ring body 20 to regulate the rotation of the clamping ring 30 by using the relationship of the projection 34 and the depression 26. Alternatively, on the contrary, a projection (equivalent to the rotation regulating projection 34) may be provided on the periphery of the ring body 20 and a depression (equivalent to the depression 26) in which the projection is positioned is provided in the clamping ring 30 to regulate the rotation of the clamping ring 30 by using the relationship of the projection and the depression.

Figure 9:
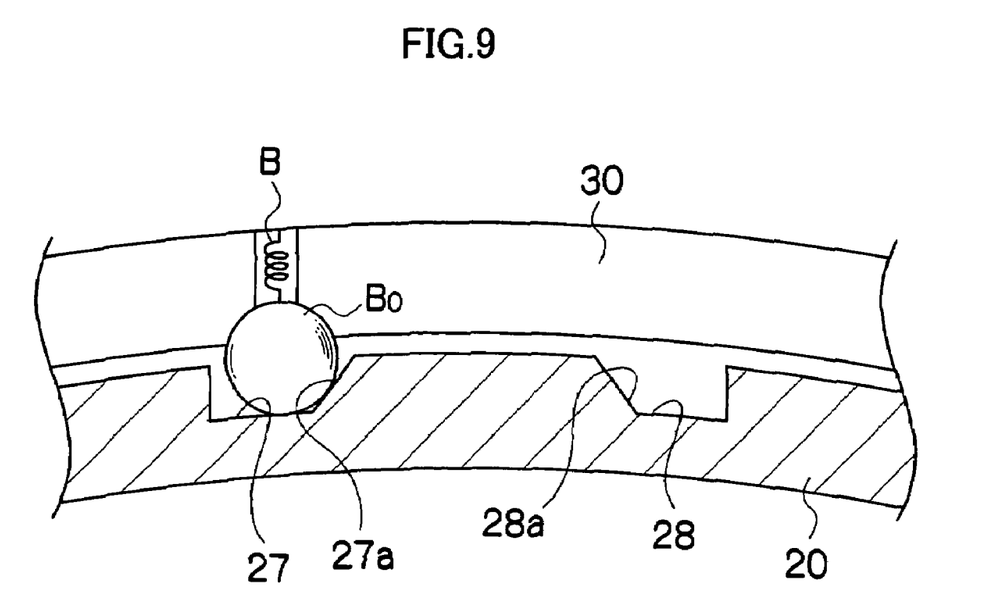
FIG. 9 describes an example of modification of the rotation regulating projection 34.

Alternatively, as illustrated in FIG. 9, depressions 27 and 28 may be provided in the ring body 20 at predetermined spaced intervals and a ball BO capable of entering depressions 27 and 28 and a spring B urging the ball BO are provided on the clamping ring 30 to regulate the rotation of the clamping ring 30. This allows the ball BO to enter the depression 27 when the clamping ring 30 is rotated counterclockwise, regulating the rotation in the direction, and the ball BO to enter the depression 28 when the clamping ring 30 is rotated clockwise, regulating the rotation in the direction. Incidentally, slopes 27a and 28a are provided on the inner walls of the depressions 27 and 28 to make the ball BO easy to pull out of the depressions 27 and 28. That is to say, the clamping ring 30 can be rotated between the depressions 27 and 28 with a weaker force.

The present embodiments are in all respects merely illustrative and not to be construed as restrictive by the above description. The present invention can be implemented in other various forms without departing from its spirit and principal features.

What is claimed is:

1. An optical option attachment ring comprising:
a ring body into which a lens barrel is inserted;
a clamping ring rotatably fastened on the periphery of the ring body;
an elastic member arranged between the ring body and the clamping ring; and
an abutting portion which is provided on the clamping ring and abuts on the elastic member according to the rotational position of the clamping ring to elastically deform the elastic member to cause at least a part of the elastic member to project further inwards than the inner peripheral surface of the ring body and to be positioned in a groove formed in the lens barrel, wherein
the ring body includes an opening causing the periphery and the inner peripheral surface of the ring body to communicate with each other,
the elastic member is a leaf spring with a fixed end fixed to the ring body, a free end movable between the inner peripheral surface of the clamping ring and the periphery of the ring body in the radial direction and a curved portion formed between the fixed end and the free end and positioned in the opening, and
the clamping ring is provided with relatively thin and thick portions on the inner peripheral surface thereof and rotated to cause the thick portion to abut on the free end of the elastic member to elastically deform the elastic member to cause the curved portion to project further inwards than the inner peripheral surface of the ring body from the opening and to be positioned in a groove formed in the lens barrel.

2. The optical option attachment ring according to claim 1, wherein
the clamping ring is rotated to cause the thick portion to abut on the free end of the elastic member to elastically deform the elastic member to cause the curved portion to project further inwards than the inner peripheral surface of the ring body from the opening and to abut on the bottom of the groove formed in the lens barrel.

3. The optical option attachment ring according to claim 2, further comprising a rotation regulating projection provided on the inner peripheral surface of the clamping ring and projecting into the opening.

4. The optical option attachment ring according to claim 1, further comprising a rotation regulating projection provided on the inner peripheral surface of the clamping ring and projecting into the opening.

5. The optical option attachment ring according to claim 1, further comprising a rotation regulating projection provided on the inner peripheral surface of the clamping ring and projecting into the opening.

* * * * *